Nov. 12, 1929.                J. G. BLUNT                1,735,492
                              LOCOMOTIVE
                         Filed May 7, 1926          4 Sheets-Sheet 1
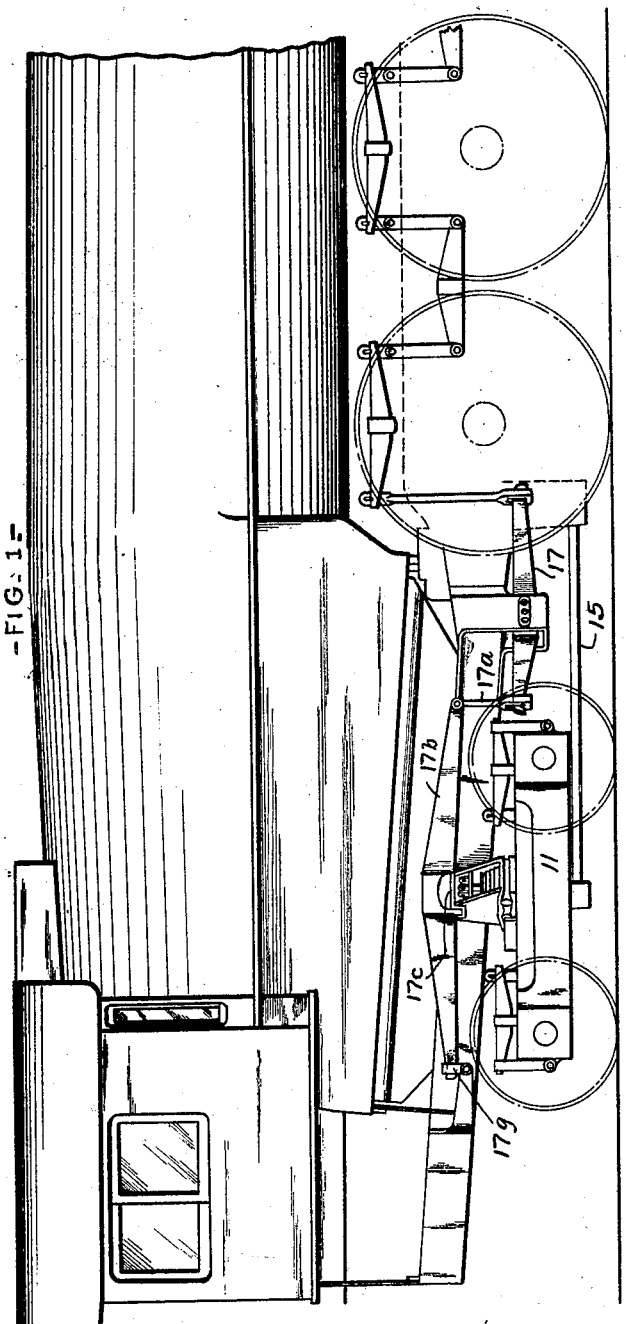
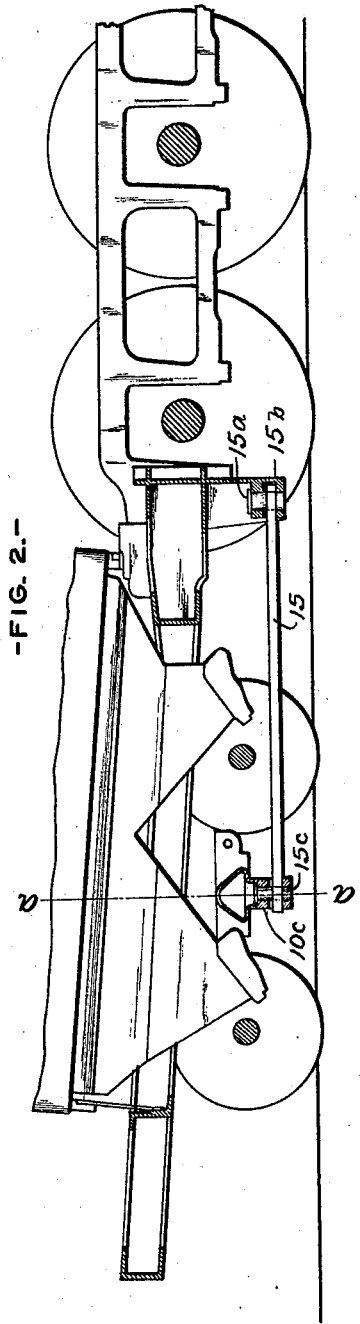

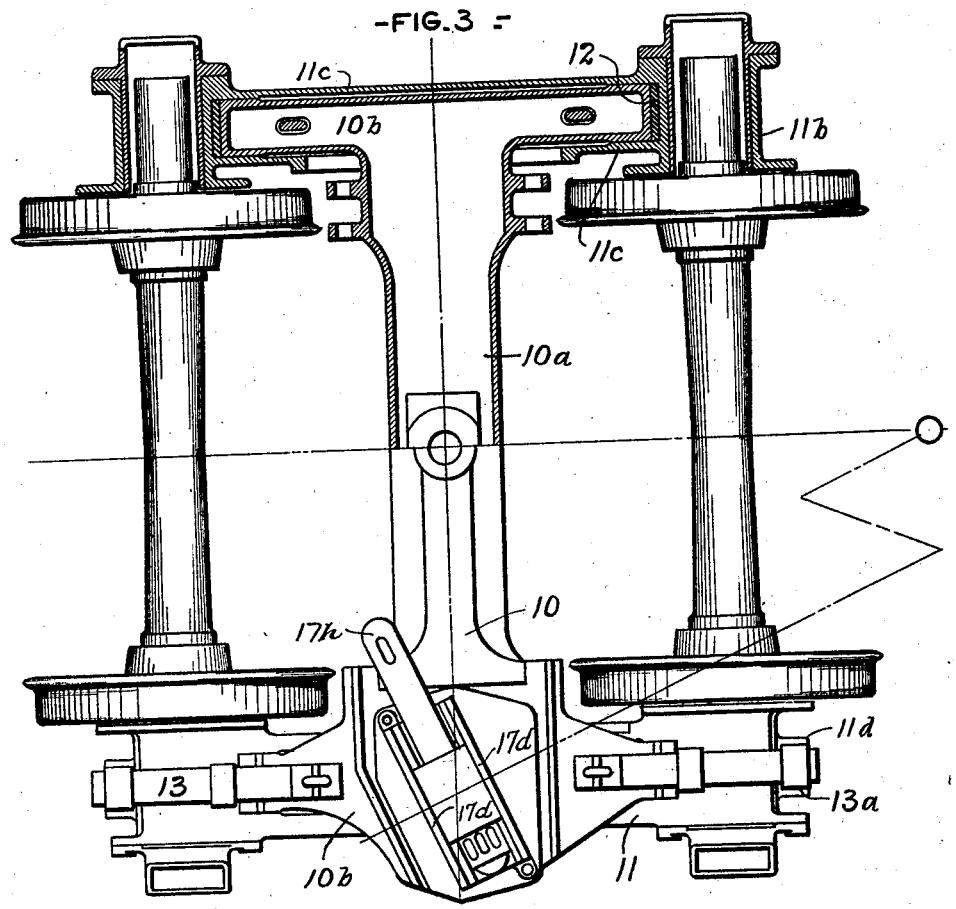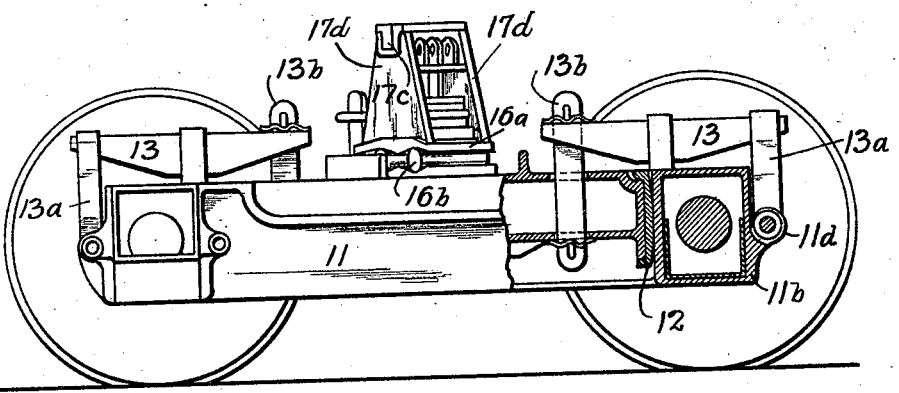

Nov. 12, 1929.        J. G. BLUNT        1,735,492
LOCOMOTIVE
Filed May 7, 1926        4 Sheets-Sheet 3
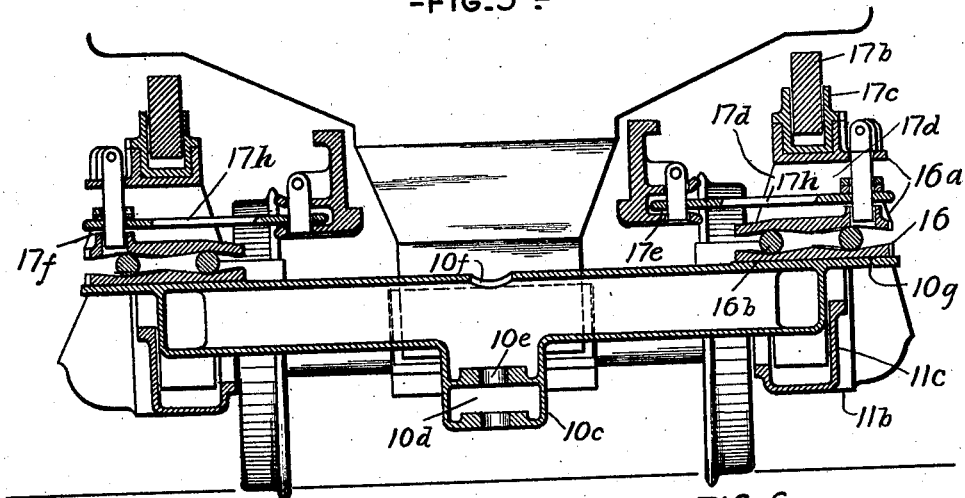
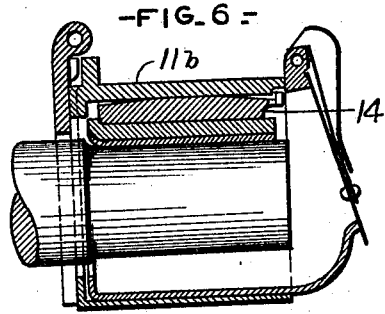
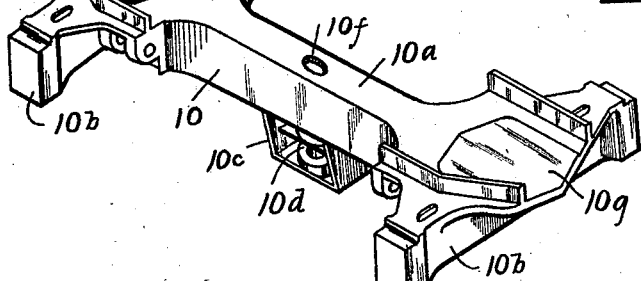
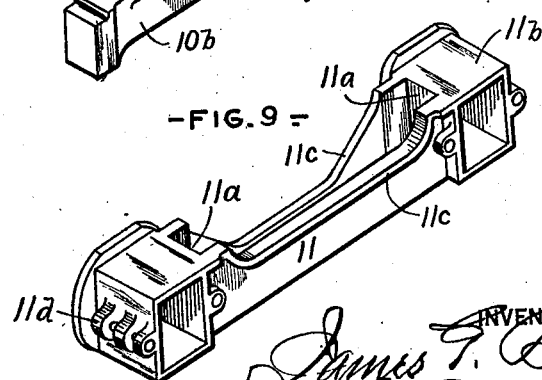
WITNESSES Nov. 12, 1929.   J. G. BLUNT   1,735,492
LOCOMOTIVE
Filed May 7, 1926   4 Sheets-Sheet 4
- FIG. 10 -
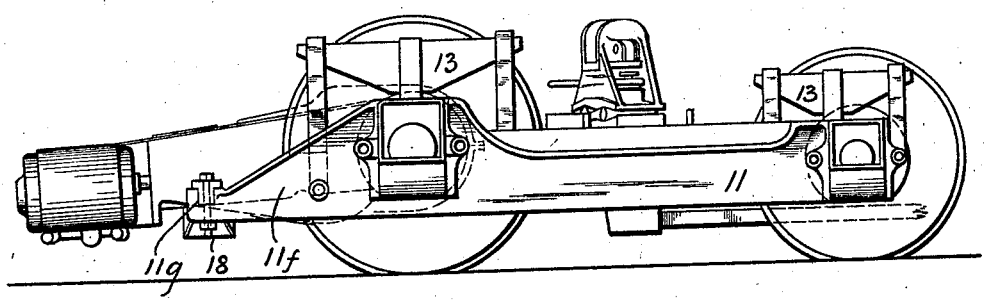
- FIG. 11 -
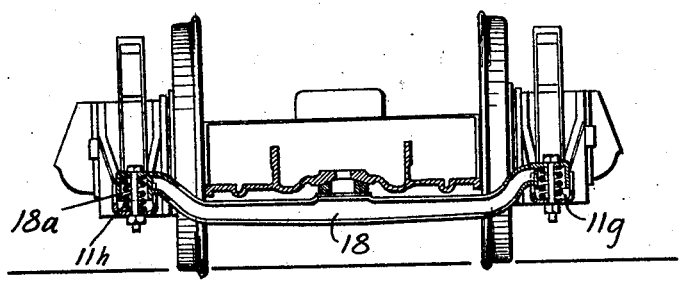

Patented Nov. 12, 1929

1,735,492

UNITED STATES PATENT OFFICE

JAMES G. BLUNT, OF SCHENECTADY, NEW YORK

LOCOMOTIVE

Application filed May 7, 1926. Serial No. 107,463.

This invention has for an object to provide a truck for locomotives, embodying a plurality of axles, and comprising a frame, of compact and durable construction; which can be easily and economically manufactured; which embodies a minimum number of parts; which provides improved means for enabling the side frame members and the bolster to be detachably connected together, without the use of bolts, rivets, or welding; which, although not embodying pedestals, enables the journal boxes to move, substantially as though mounted in pedestals; which embodies a bolster, having end pieces, adapted to serve as equalizing levers; which provides efficient means for supporting a booster motor; which can be readily modified to impose any desired load on the truck wheels driven by the booster motor; and which possesses superior riding qualities.

A further object of the invention is to provide improved means for equalizing the load between the driving wheels and the trailing truck wheels, and for centering the trailing truck.

Another object of the invention is to provide improved means for coupling the trailing truck to the main frame, which means, while providing ample clearance for the ash pan hoppers, enables the trailing truck axles to assume positions on curved track, more nearly radial than has been the case with the couplings heretofore known, thus obviating a great amount of friction and wear.

The improvement claimed is hereinafter fully set forth.

In the accompanying drawings: Figure 1 is a view, in side elevation, of the rear end of a locomotive embodying the invention; Fig. 2, a side view, partly in elevation and partly in section, of the lower portion of the rear end of a locomotive, showing the improved means for coupling the trailer truck to the main frame; Fig. 3, a plan view of the improved truck, a portion thereof being shown in section; Fig. 4, a side view of the same, partly in elevation and partly in section; Fig. 5, a vertical transverse section, of the lower portion of the rear end of a locomotive embodying the invention, taken on the line $a\ a$ of Fig. 2; Fig. 6, a vertical longitudinal section through one of the journal boxes; Figs. 7, 8 and 9, isometric views, respectively, of the bolster, one of the wear shoes for the bolster end pieces, and one of the side frame members; Fig. 10, a view, in side elevation, showing a modified form of truck, embodying a booster motor, and a support therefor; and, Fig. 11, a rear end view of the same, partly in elevation, and partly in section.

In the practice of the invention, referring descriptively to the specific embodiment thereof which is herein exemplified, as applied in a locomotive embodying a four-wheel trailing truck of the outside bearing type, the truck comprises a frame, formed of three integral castings, viz: a bolster, 10, and two side frame members, 11.

The bolster is substantially H shaped, comprising a body or cross piece, $10^a$, and two end pieces, $10^b$, which are disposed at a right angle to the cross piece, and are joined thereto intermediate their length. The end pieces are adapted to slidingly fit, in the manner of tenons, into mortises or pockets, $11^a$, formed in the side frame members, and serve to lock the side frame members and the bolster securely together, and to maintain the parallelism of the side frame members.

The cross piece, $10^a$, of the bolster, is substantially box shaped, comprising a top, a bottom, and two side walls. The side walls converge upwardly to provide the maximum amount of clearance for the ash pan hoppers.

To provide for pivotally connecting the rear end of the radius bar to the truck frame, the cross piece, $10^a$, is formed with a housing, $10^c$, disposed centrally of, and depending from, the bottom wall of the cross-piece. The housing comprises a top, a bottom, and two side walls. The space bounded by the walls, provides a pocket, $10^d$, adapted to receive the rear end of the radius bar. The top and the bottom walls of the pocket are each provided with a bore, $10^e$, for a radius bar pin, and the top wall of the cross piece, is provided with a concentric opening, $10^f$, to permit the insertion or removal of the pin.

The top wall of the cross piece, $10^a$, is expanded near each end and merges with an expanded central portion of the end pieces, $10^b$, to provide a seat, $10^g$, for a lower roller seat. A pair of brake shoe hanger lugs is formed on each end of the cross piece, on each side thereof.

Each side frame member, 11, is formed at each end with a journal box, $11^b$, and the two boxes are connected together by two spaced vertical longitudinal walls, $11^c$. The space between the side walls, $11^c$, and the inner side walls of the journal boxes constitutes a pocket, $11^a$, in which one of the end pieces, $10^b$, fits with the capacity of vertical movement and longitudinal tilting movement. It is to be noted that the side frames are mounted on journals disposed outside of the wheels. The central portion of the inner side wall of each side frame member is reduced in height to provide ample clearance for relatively vertical movement of the bolster.

To provide for taking up the wear on the ends of the end pieces, $10^b$, and to permit the necessary longitudinal tilting movements thereof, wear shoes, 12, are provided. Each wear shoe has the top and the bottom portions, $12^a$, of its front face, oppositely bevelled, and a top and a bottom horizontal flange at its rear, adapted to fit over an end of the end piece, to secure the shoe thereto. To permit one of the side frame members to rise and fall relatively to the other to accommodate the truck to irregularities in the track, each journal box is provided with a wedge, 14, having a longitudinally convexly curved upper face.

A plate spring, 13, is mounted on the top of each of the journal boxes, to transmit the weight imposed on the bolster to the journal box. One end of each spring is connected to the upper end of a hanger, $13^a$, the lower end of the hanger being pivotally connected to a lug, $11^d$, formed on the outer side wall of the journal box. The other end of each spring is connected to one of the end pieces, $10^b$, of the bolster, by a hanger, $13^b$, which extends through slots in the top and bottom walls of the end piece, and is locked against retraction by a suitable gib.

It will be noted from the foregoing description that the end pieces of the bolster serve as equalizer levers, to distribute the load imposed on the bolster, between the two axles. By varying the disposition of the pockets, $11^a$, in the side frame members, or the disposition of the cross piece with relation to the ends of the end pieces, the amount of load imposed on the two axles can be varied to meet the requirements of service. If a booster motor is employed, the amount of weight imposed on the driven axle can be increased, by making either or both of the structural modifications stated. Further capacity for effecting any desired distribution of weight between the two axles, is afforded by varying the length of the springs, or their fulcrum points.

It should be noted that the improved construction, while not embodying pedestals, permits the journal boxes to move substantially as though mounted in pedestals.

In order to provide for the proper lateral movement of the truck, relatively to the main frame of the locomotive, when the locomotive passes from tangent to curved track, a radius bar, 15, is provided. This bar is disposed below the axles of the truck, to provide the necessary clearance for the ash pan hoppers. The front end of the bar is pivotally connected, by a pin, $15^a$, to the bracket, $15^b$, attached to the main frame, and the rear end of the bar is pivotally connected, by a pin, $15^c$, to the housing, $10^e$, depending from the cross piece, $10^a$, of the truck bolster. It will be seen that the pivotal axis of the rear end of the bar, is disposed between, and substantially equidistant from, the two axles. The employment of the double pivoted connection between the truck and the main frame permits the two axles of the truck to assume, on curved track, balanced positions, relatively to a true radius of the curve, which feature is highly advantageous, in that it effects a substantial reduction in friction, and a consequent saving in wear.

For the purpose of permitting the proper degree of lateral movement of the truck, on curved track, and providing for the return of the truck to normal central position on tangent track, a pair of lateral motion devices of the roller type, is provided. Each of these devices comprises a lower roller seat, 16, which has oppositely inclined upper bearing surfaces, and which is fastened to the seat, $10^g$, at the end of the bolster. The upper roller seat, $16^a$, also has bearing surfaces which are oppositely inclined to the bearing surfaces of the lower seat. A pair of rollers, $16^b$, is interposed between the two seats.

To provide for distributing the load of the rear end of the locomotive between the trailing truck wheels and the rear group of driving wheels, an improved equalizing mechanism is employed, which will now be described.

This mechanism comprises two equalizer levers, 17, fulcrumed on the main frame, each connected, by a hanger, $17^a$, to the front end of one of a pair of equalizer levers, $17^b$, which are fulcrumed on the seats, $17^c$. The fulcrum seats, $17^c$, are spaced from, and supported above, the upper roller seats, $16^a$, by two spaced vertical walls, $17^d$, integrally united to the fulcrum seats and the upper roller seats.

In order to anchor the fulcrum seats to the cradle of the locomotive, with the capacity of vertical movement, a link, $17^h$, is provided for each of the seats. The inner end of each link is connected to the cradle, by a pin, oblong in cross-section, which passes through similarly shaped slots in the end of the link, and the jaws, 17ᵉ, projecting from the cradle, while the outer end of the link projects through the pocket, 17ᶠ, between each fulcrum seat and upper roller seat, and is connected to the two seats, by a pin, oblong in cross-section, which passes through slots formed in the seats and the outer end of the link. This construction enables relatively long links to be employed, reducing, to a minimum, lateral displacement of the equalizer levers, 17ᵇ. The rear ends of the equalizer levers, 17ᵇ, are connected to the cradle by hangers, 17ᵍ.

In Figs. 10 and 11, of the drawings, there is shown a structural modification, wherein provision is made for supporting a booster motor. In this form of construction, the rear ends, 11ᶠ, of the side frame members, are extended to provide a pocket, 11ᵍ, in which fits a helical spring, 11ʰ. A cross member 18, for supporting the booster motor, has each of its ends formed with a pocket, 18ᵃ, in which is fitted the upper end of one of the springs, 11ʰ. A bolt, passing through the pockets, 11ᵍ and 18ᵃ, and the spring, 11ʰ, serves to secure each end of the booster support to the rear end of one of the side frame members.

The invention claimed as new and desired to be secured by Letters Patent is:

1. In a trailing truck of the outside bearing type, the combination of two side frame members, each comprising a plurality of journal boxes; a bolster embodying integral end pieces by which it is coupled to the side frame members, said end pieces being adapted both for vertical movement, and longitudinal tilting movement, relatively to the side frame members; and springs from which the bolster is suspended.

2. In a truck for railroad vehicles, the combination of two side frame members, each comprising a mortise, and a plurality of journal boxes; and a bolster, having integrally formed on each of its ends, a tenon, adapted to fit in the mortise of one of the side frame members, said tenons being adapted to maintain the parallelism of the side frame members, and to slide vertically, and tilt longitudinally, relatively to the said members.

3. In a truck for railroad vehicles, the combination of two side frame members, each formed as an integral casting, and comprising a plurality of journal boxes; and a bolster, formed as an integral casting, and embodying end pieces, by which it is coupled to the side frame members, said end pieces being adapted both for vertical movement, and for longitudinal tilting movement, relatively to the side frame members.

4. In a truck for railroad vehicles, the combination of two side frame members, each formed as an integral casting, and comprising a mortise, and a plurality of journal boxes; and a bolster formed as an integral casting, and embodying, at each end, a tenon, adapted to fit in the mortise of one of the side frame members, said tenons being adapted to maintain the parallelism of the side frame members, and to slide vertically, and tilt longitudinally, relatively to the said members.

5. In a truck for railroad vehicles, the combination of two side frame members, each comprising a mortise, and a plurality of journal boxes, the mortise, in horizontal cross section, being of greater length than width, its length being disposed longitudinally of the side frame member; and a bolster, comprising two end pieces and a cross piece, disposed at a right angle to the end pieces, and joined thereto intermediate their lengths, each of said end pieces being adapted to fit in the mortise of one of the side frame members, with the capacity of both vertical movement and longitudinal tilting movement, relatively to the said members.

6. In a trailing truck for locomotives, the combination of two side frame members, each comprising a mortise, and a plurality of journal boxes, the mortise, in horizontal cross section, being of greater length than width, its length being disposed longitudinally of the side frame member; and a bolster, comprising two end pieces, and a cross piece, disposed at a right angle to the end pieces, and joined thereto intermediate their lengths, the cross piece comprising upwardly converging side walls, to provide maximum ash pan clearance, each of said end pieces being adapted to fit in the mortise of one of the side frame members, with the capacity of both vertical movement and longitudinal tilting movement, relatively to said members.

7. In combination a bolster for trucks for railroad vehicles, comprising two parallel end pieces, and a cross-piece, disposed at a right angle to the end pieces, and joined thereto, intermediate their lengths, said end pieces constituting tenons adapted to slidingly fit in mortises in side frame members; and springs from which the bolster is suspended.

8. In combination a bolster for trucks for railroad vehicles, formed as an integral casting, and comprising two parallel end pieces, and a cross piece disposed at a right angle to the end pieces, and joined thereto, intermediate their lengths, said end pieces constituting tenons, adapted to slidingly fit in mortises in side frame members; and springs from which the boster is suspended.

9. A bolster for trailing trucks for locomotives, comprising two parallel end pieces, and a cross piece disposed at a right angle to the end pieces, and joined thereto, intermediate their lengths, the cross piece having upwardly converging side walls, to provide maximum clearance for an ash pan hopper, the end pieces constituting tenons, adapted to slidingly fit in mortises in side frame members.

10. A bolster for trailing trucks for locomotives, formed as an integral casting, and comprising two parallel end pieces, and a cross piece, disposed at a right angle to the end pieces, and joined thereto, intermediate their lengths, the cross pieces having upwardly converging side walls, to provide maximum clearance for an ash pan hopper, the end pieces constituting tenons, adapted to slidingly fit in mortises in side frame members.

11. A bolster for trailing trucks for locomotives, comprising two parallel end pieces; a cross piece disposed at a right angle to the end pieces, and joined thereto, intermediate their lengths, said end pieces constituting tenons, adapted to slidingly fit in mortises in side frame members; and a housing, supported by, and disposed centrally of, the cross piece, for receiving the rear end of a radius bar, said housing having spaced, vertically aligned bores, for the reception of a radius bar pivot pin.

12. A bolster for trailing trucks for locomotives, formed as an integral casting, and comprising two parallel end pieces; a cross piece, disposed at a right angle to the end pieces, and joined thereto, intermediate their lengths, said end pieces constituting tenons, adapted to slidingly fit in mortises in side frame members; and a housing, supported by, and disposed centrally of, the cross piece, for receiving the rear end of a radius bar, said housing having spaced, vertically aligned bores for the reception of a radius bar pivot pin.

13. A side frame member for trucks for railroad vehicles, formed as an integral casting, and comprising a pair of journal boxes, and two spaced, vertical, parallel, longitudinal walls, joined to the inner side walls of the journal boxes, the space between the longitudnial walls and the inner side walls of the journal boxes, constituting a mortise, which, in horizontal cross section, is of greater length than width, said mortise being adapted to receive a tenon, for coupling the side frame member to a bolster.

14. In a truck for railroad vehicles, the combination of a bolster, comprising a cross piece, and end pieces, disposed at a right angle thereto; a pair of side frame members, each coupled to one of the end pieces, with the capacity of vertical movement, and longitudinal tilting movement, relatively thereto, each of said members comprising a pair of journal boxes; a pair of plate springs, mounted on each side frame member; a hanger, connecting one end of each spring to a side frame member; and a hanger, connecting the other end of each spring to one of the end pieces.

15. In a truck for railroad vehicles, the combination of a bolster, comprising a cross piece, and a pair of end pieces, disposed at a right angle thereto; a pair of side frame members, each comprising a pair of journal boxes, and a mortise, in which one of the end pieces fits, with the capacity of vertical movement, and longitudinal tilting movement, relatively to the side frame member; a plate spring, mounted on the top of each journal box; a hanger, connecting one end of each spring to a side frame member; and a hanger, connecting the other end of each spring to an end of one of the end pieces.

16. In a locomotive, the combination of a main frame; a trailing truck, comprising a plurality of axles; and a radius bar, having its print end pivotally connected to the main frame, and its rear end pivotally connected to the truck, intermediate two of the axles, thereof, said rear end being disposed below the front axle of the truck, to provide clearance for an ash pan hopper.

17. In a locomotive, the combination of a group of driving wheels; an equalizing system therefor; a cradle; a trailing truck, comprising a plurality of wheeled axles, having their journals disposed outside of the wheels, and a frame, embodying a bolster, and a pair of side frame members, mounted on the journals; a lateral motion centering device, mounted at each end of the bolster, comprising a lower roller seat, and an upper roller seat; a fulcrum seat, spaced above, and connected to, the upper roller seat, to provide a pocket; a link for each fulcrum seat, having one end pivotally connected to the cradle, and its other end fitted in said pocket and pivotally connected to the fulcrum seat; and an equalizer lever, fulcrumed on each fulcrum seat, and having its rear end connected to the cradle, and its front end connected to the equalizing system of the driving wheels.

18. In a locomotive, the combination of a group of driving wheels; an equalizing system therefor; a main frame; a cradle; a trailing truck, comprising a plurality of wheeled axles having their journals disposed outside of the wheels, and a frame, embodying a bolster and a pair of side frame members, mounted on the journals; a lateral motion centering device, mounted at each end of the bolster, comprising a lower roller seat, and an upper roller seat; a fulcrum seat, spaced above, and connected to, the upper roller seat, to provide a pocket; a link for each fulcrum seat, having one end pivotally connected to the cradle and its other end fitted in one of said pockets, and pivotally connected to a fulcrum seat; an equalizer lever fulcrumed on each fulcrum seat, and having its rear end connected to the cradle and its front end connected to the equalizing system of the driving wheels; and a radius bar, having its front end pivotally connected to the main frame, and its rear end pivotally connected to the truck frame, intermediate two of the axles thereof, said rear end of the bar being disposed below the front axle of the truck, to provide clearance for an ash pan hopper.

19. In a locomotive, the combination of a main frame; a four wheel trailing truck; a bolster therein; a pivot bearing, disposed below the top of said bolster; and a link, forming the connection between the truck and the main frame, said link being pivotally connected to the pivot bearing of said truck.

20. In a four wheel trailing truck for locomotives, the combination of a pair of side frame members, disposed outside of the wheels thereof; a journal box, at each end of each side frame member; a bolster, connecting the side frames together, and having end pieces, adapted both to lock the bolster to the side frame members, and to serve as equalizer levers; and springs from which the bolster is suspended.

21. In a trailing truck for locomotives, the combination of a plurality of wheeled axles, having their journals disposed outside of the wheels; a pair of side frame members, mounted on the journals; a bolster, connecting the side frame members; a pair of journal boxes in each of the side frame members; and a spring seated on each journal box, each spring having one end connected to an end of a side frame member and its other end connected to an end of the bolster, the said spring means being adapted to co-operate to equalize the load transmitted through the bolster and the side frame member between the truck axles.

22. In a trailing truck for locomotives, the combination of a plurality of wheeled axles, having their journals disposed outside of the wheels; a pair of side frame members, mounted on the journals; a spring pocket, at the rear end of each of the side frame members; a spring, in each pocket; and a booster motor support having each of its ends mounted on one of the springs.

JAMES G. BLUNT.